(12) United States Patent
Scott et al.

(10) Patent No.: US 7,852,836 B2
(45) Date of Patent: Dec. 14, 2010

(54) REDUCED ARBITRATION ROUTING SYSTEM AND METHOD

(75) Inventors: Steven L. Scott, Chippewa Falls, WI (US); Dennis C. Abts, Chippewa Falls, WI (US); Gregory Hubbard, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 208 days.

(21) Appl. No.: 11/932,413

(22) Filed: Oct. 31, 2007

(65) Prior Publication Data

US 2008/0151909 A1    Jun. 26, 2008

Related U.S. Application Data

(63) Continuation of application No. 11/825,618, filed on Jul. 5, 2007, now abandoned, which is a continuation of application No. 11/600,339, filed on Nov. 14, 2006, now abandoned, which is a continuation of application No. 11/439,382, filed on May 22, 2006, now abandoned, which is a continuation of application No. 11/358,931, filed on Feb. 21, 2006, now abandoned, which is a continuation of application No. 11/172,460, filed on Jun. 30, 2005, now abandoned, which is a continuation of application No. 10/992,504, filed on Nov. 18, 2004, now abandoned.

(60) Provisional application No. 60/523,256, filed on Nov. 19, 2003, provisional application No. 60/253,361, filed on Nov. 19, 2003, provisional application No. 60/523,241, filed on Nov. 19, 2003.

(51) Int. Cl.
*H04L 12/28* (2006.01)
*H04L 12/56* (2006.01)

(52) U.S. Cl. ............... 370/388; 370/412; 370/413; 370/414; 710/317

(58) Field of Classification Search ........... 370/412, 370/413, 414
See application file for complete search history.

(56) References Cited

U.S. PATENT DOCUMENTS

| 4,630,194 | A  | * | 12/1986 | Oliver et al. ............ 710/100 |
| 5,663,961 | A  | * | 9/1997  | McRoberts et al. ........ 370/412 |
| 6,674,720 | B1 | * | 1/2004  | Passint et al. ........... 370/235 |
| 7,085,224 | B1 | * | 8/2006  | Oran ..................... 370/216 |
| 7,274,690 | B1 | * | 9/2007  | Park et al. .............. 370/388 |
| 7,391,728 | B2 | * | 6/2008  | Natarajan et al. ......... 370/235 |
| 7,551,645 | B2 | * | 6/2009  | Gulati et al. ............ 370/474 |
| 2001/0028659 | A1 | * | 10/2001 | Johnson et al. ........ 370/413 |
| 2002/0012344 | A1 | * | 1/2002  | Johnson et al. ........ 370/389 |
| 2003/0026267 | A1 | * | 2/2003  | Oberman et al. ........ 370/397 |
| 2004/0085979 | A1 | * | 5/2004  | Lee et al. ............. 370/412 |
| 2004/0103218 | A1 | * | 5/2004  | Blumrich et al. ....... 709/249 |
| 2004/0114617 | A1 | * | 6/2004  | Sim et al. ............ 370/413 |
| 2004/0213157 | A1 | * | 10/2004 | Karlsson et al. ....... 370/235 |

* cited by examiner

*Primary Examiner*—Ayaz R Sheikh
*Assistant Examiner*—Tarell Hampton
(74) *Attorney, Agent, or Firm*—Schwegman, Lundberg & Woessner, P.A.

(57) ABSTRACT

A system and method for routing packets from one node to another node in a system having a plurality of nodes connected by a network. A node router is provided in each node, wherein the node router includes a plurality of network ports, including a first and a second network port, wherein each network port includes a communications channel for communicating with one of the other network nodes, a plurality of virtual channel input buffers and a plurality of virtual channel staging buffers, wherein each of the virtual channel staging buffers receives data from one of the plurality of input buffers.

17 Claims, 11 Drawing Sheets

```
IF(INHIBIT)
    INHIBIT = 0; # ASSUME WE CAN SAFELY SWITCH TO A NEW EPOCH
    IF((EPOCH==1 AND EPOCH_CTR[0]>0) OR (EPOCH==0 AND EPOCH_CTR[1]>0))
        INHIBIT = 1; # DON'T ALLOW THE EPOCH TO CHANGE
ELSE
    DECREMENT(AGE_CLOCK_PERIOD_REG);
    IF(AGE_CLOCK_PERIOD_REG==0) # COUNTDOWN TIMER EXPIRED
        AGE_CLOCK_PERIOD_REG = RTR_AGE_CLK_PERIOD; # RELOAD COUNTER
        IF(TIMESTAMP==255) #WE ARE ABOUT TO ROLL OVER THE TIMESTAMP VALUE TO ZERO
            INHIBIT = 0; # ASSUME WE CAN SAFELY SWITCH TO A NEW EPOCH
            IF((EPOCH==1 AND EPOCH_CTR[0]>0) OR (EPOCH==0 AND EPOCH_CTR[1]>0))
                INHIBIT = 1; # DON'T ALLOW THE EPOCH TO CHANGE
            ELSE
                INCREMENT(TIMESTAMP); #ADJUST THE TIMESTAMP;
                EPOCH = ~EPOCH; # SWITCH TO THE OTHER EPOCH
```

| VARIABLE NAME | VALID VALUES | DESCRIPTION |
|---|---|---|
| AGE | 0..255 | PACKET AGE THAT CORRESPONDS TO BITS FLIT[7:0] |
| TIMESTAMP | 0..255 | FREE RUNNING COUNTER THAT SERVES TO MARK THE PASSING OF TIME |
| EPOCH | 0..1 | THE CURRENT EPOCH NUMBER FOR WHICH THE TIMESTAMP REFERS |
| NEW_AGE | 0..255 | INTERMEDIATE AGE CALCULATION |
| SATURATION | 0..1 | FLAG WHICH INDICATES IF PACKET AGE SATURATES AT MAX OF 255 |
| ROLLOVER | 0..1 | FLAG WHICH INDICATES THE TIMESTAMP COUNTER HAS ROLLED OVER |
| EPOCH_CTR[EPOCH] | 0..2048 | A COUNTER TO REPRESENT THE NUMBER OF PACKETS IN A GIVEN EPOCH |
| AGE_CLOCK_PERIOD_REG | 0..232 | THE INTERNAL COPY OF THE RTR_AGE_CLOCK_PERIOD MMR |

*Fig. 7*

```
IF(INHIBIT)
        INHIBIT = 0; # ASSUME WE CAN SAFELY SWITCH TO A NEW EPOCH
        IF((EPOCH==1 AND EPOCH_CTR[0]>0) OR (EPOCH==0 AND EPOCH_CTR[1]>0))
                INHIBIT = 1; # DON'T ALLOW THE EPOCH TO CHANGE
ELSE
        DECREMENT(AGE_CLOCK_PERIOD_REG);
        IF(AGE_CLOCK_PERIOD_REG==0) # COUNTDOWN TIMER EXPIRED
                AGE_CLOCK_PERIOD_REG = RTR_AGE_CLK_PERIOD; # RELOAD COUNTER
                IF(TIMESTAMP==255) #WE ARE ABOUT TO ROLL OVER THE TIMESTAMP VALUE TO ZERO
                        INHIBIT = 0; # ASSUME WE CAN SAFELY SWITCH TO A NEW EPOCH
                        IF((EPOCH==1 AND EPOCH_CTR[0]>0) OR (EPOCH==0 AND EPOCH_CTR[1]>0))
                                INHIBIT = 1; # DON'T ALLOW THE EPOCH TO CHANGE
                        ELSE
                                INCREMENT(TIMESTAMP); #ADJUST THE TIMESTAMP;
                                EPOCH = ~EPOCH; # SWITCH TO THE OTHER EPOCH
```

*Fig. 10*

REDUCED ARBITRATION ROUTING SYSTEM AND METHOD

CROSS-REFERENCE TO RELATED APPLICATIONS

This application is a continuation application of U.S. patent application Ser. No. 11/825,618 filed Jul. 5, 2007 now abandoned, which is a continuation application of U.S. patent application Ser. No. 11/600,339 filed Nov. 14, 2006 now abandoned, which is a continuation application of U.S. patent application Ser. No. 11/439,382 filed May 22, 2006 now abandoned, which is a continuation application of U.S. patent application Ser. No. 11/358,931 filed Feb. 21, 2006 now abandoned, which is a continuation application of U.S. patent application Ser. No. 11/172,460 filed Jun. 30, 2005 now abandoned, which is a continuation application of U.S. patent application Ser. No. 10/992,504, entitled "Massively Parallel Processing Supercomputer" and filed Nov. 18, 2004 now abandoned, which claims priority to U.S. Provisional Applications No. 60/523,256, entitled "MASSIVELY PARALLEL PROCESSING SUPERCOMPUTER," filed Nov. 19, 2003; No. 60/523,361, entitled "MESSAGE ROUTING UNIT," filed Nov. 19, 2003, and No. 60/523,241, entitled "RESILIENCY COMMUNICATIONS ARCHITECTURE," filed Nov. 19, 2003, all of which are incorporated herein in their entirety by reference.

This application is related to U.S. patent application Ser. No. 11/932,457, entitled "Routing Table Architecture," filed on Oct. 31, 2007, which is incorporated herein by reference.

BACKGROUND OF THE INVENTION

1. Field of the Invention

The present invention is relates generally to the field of high-speed digital data processing systems, and more particularly to systems and methods of routing packets in multiprocessor computer systems.

2. Background Information

High-end multiprocessor computer systems typically consist of nodes interconnected by physical communication links. Often the physical links connect the nodes in an n-dimensional topology. Router logic connected to the physical links routes packets through the interconnect network.

Performance of interconnect networks depends on routing policy and flow control policy. Routing policy determines the path taken by a packet from source to destination. Flow control policy determines how the packet moves along that path. According to Peh and Dally in "A Delay Model for Router Microarchitectures," published January-February 2001 in IEEE Micro, flow control policy significantly shapes an interconnect network's performance by its selection of the packets that receive buffers and channels. A poor flow control policy can result in a network that saturates at 30% of capacity, while a good flow control policy enables a network to operate at 80% or higher capacity.

Virtual-channel flow control improves network performance by reducing the blocking of physical channels. It does this by associating two or more virtual channels with a physical channel. Blocking of one of the virtual channels does not block the physical channel. When a packet blocks while holding a virtual channel, other packets can traverse the physical channel through the other virtual channel.

As virtual channels are added, the complexity of routing packets through a router increases. What is needed is system and method for reducing the complexity of routing packets through the router while maintaining high packet throughput.

BRIEF DESCRIPTION OF THE DRAWINGS

FIGS. 7 and 8 illustrate packet aging;

FIGS. 9 and 10 illustrate aging algorithms; and

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
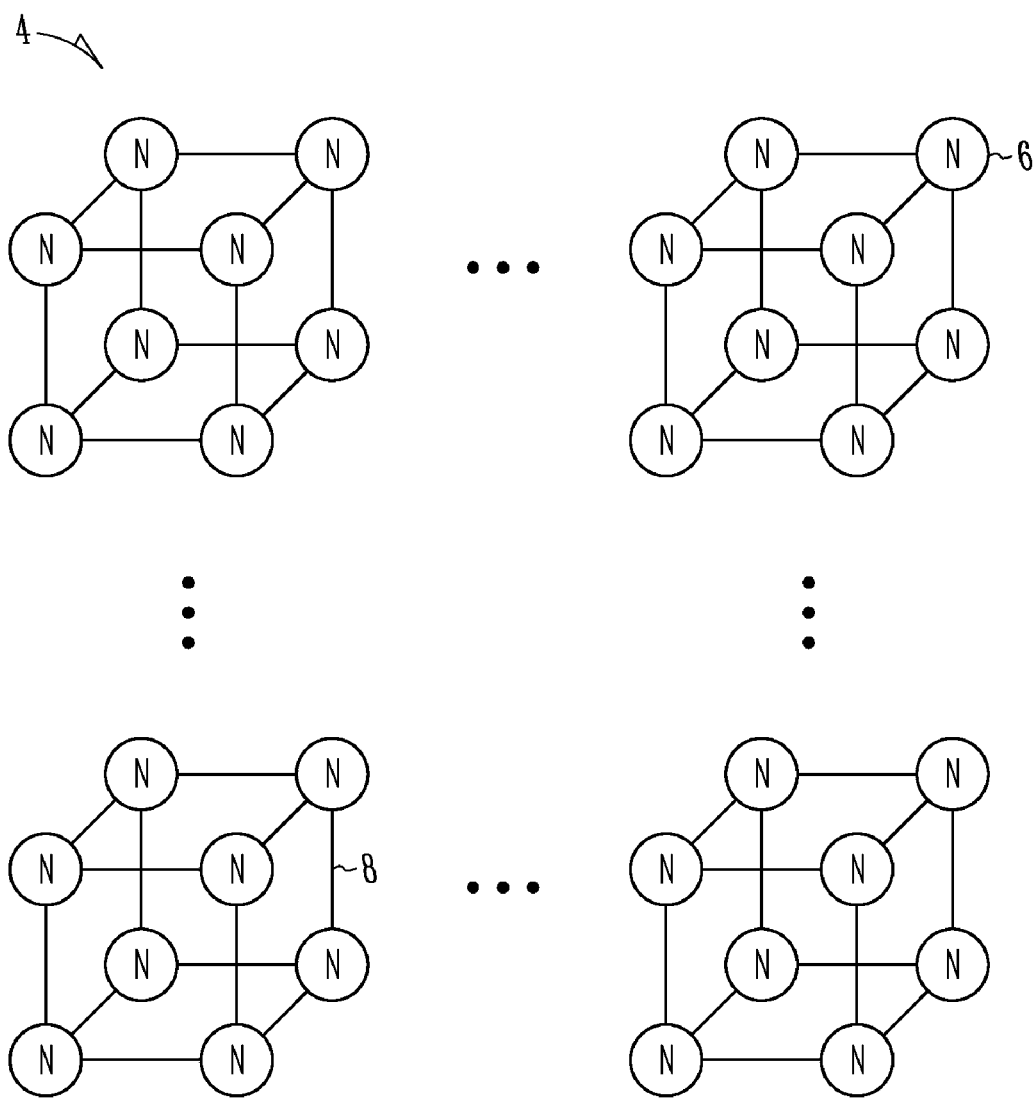
FIG. 1 illustrates a computer system according to the present invention.

A computer system 4 having a plurality of processor nodes 6 connected by links 8 is shown in FIG. 1. Each node 6 includes a router (not shown) used to route packets across links 8 in the manner to be described below.

Figure 2:
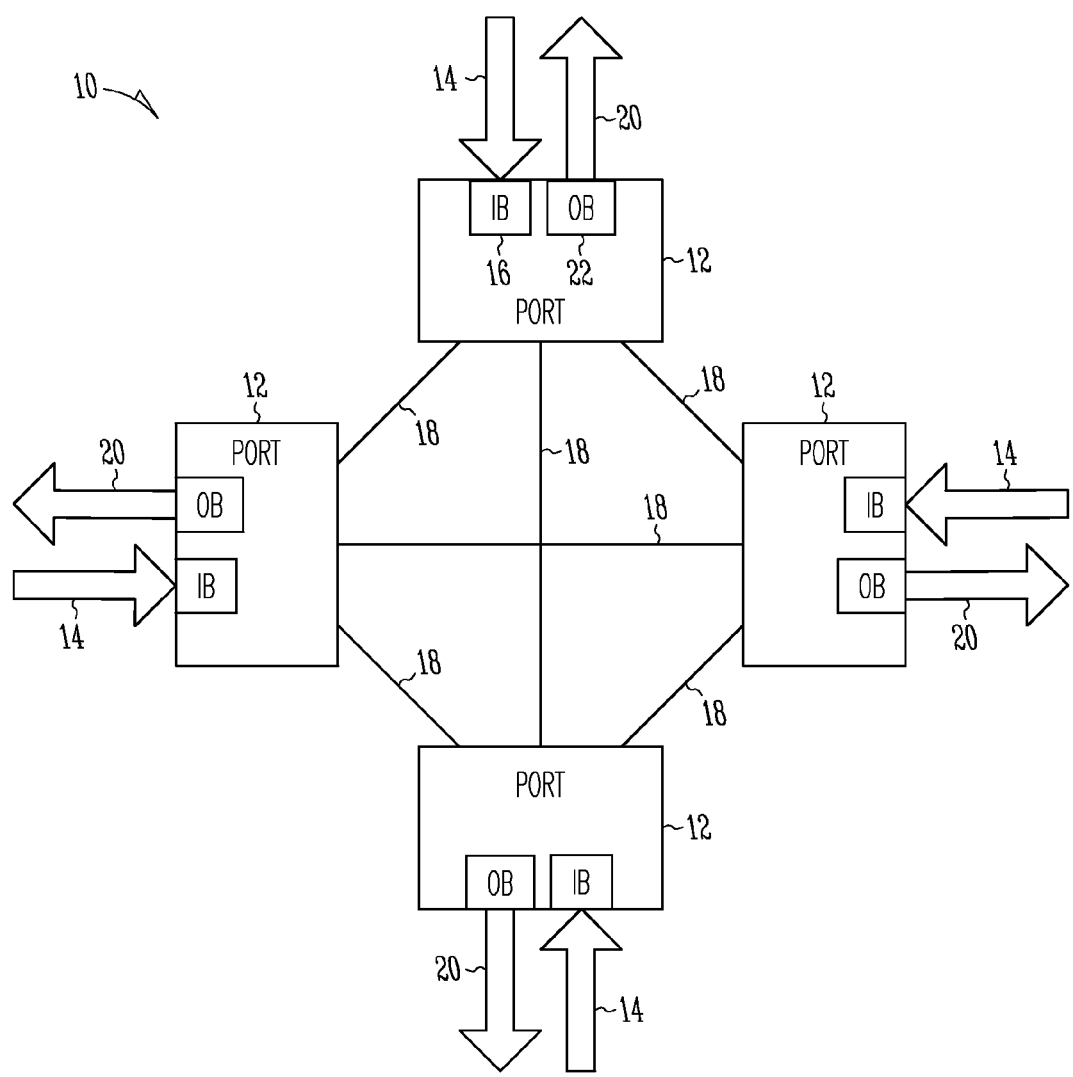
FIG. 2 illustrates a router that can be used in the computer system of FIG. 1.

One router which can be used in processor node 8 of computer system 6 is shown in FIG. 2. Router 10 includes four network ports 12 and a data path 18 connecting each network port 12 to each of the other network ports 12. Each network port includes an input 14, an input buffer 16, an output 20, and an output buffer 22. In one embodiment, data paths 18 between each of the network ports 12 are formed using a crossbar switch.

Router 10 uses a distributed routing table mechanism where a look up table (LUT) at each input port is used to determine the output port. All routing is virtual cut through, where packets are allowed to move to the destination buffer only if the entire packet fits. This prevents subsequent packets from blocking due to a packet that is straddling a buffer.

In one embodiment, all routes are traversed using dimension order routing, with the order of traversal being X, Y and then Z dimension.

In one embodiment, each network port 12 supports a plurality of virtual channels. In one embodiment, each input buffer includes a virtual channel input buffer for each virtual channel. Each virtual channel input buffer is capable of storing at least one packet.

In one embodiment, input 14 and output 20 cooperate to form a full duplex communication channel.

Figure 3:
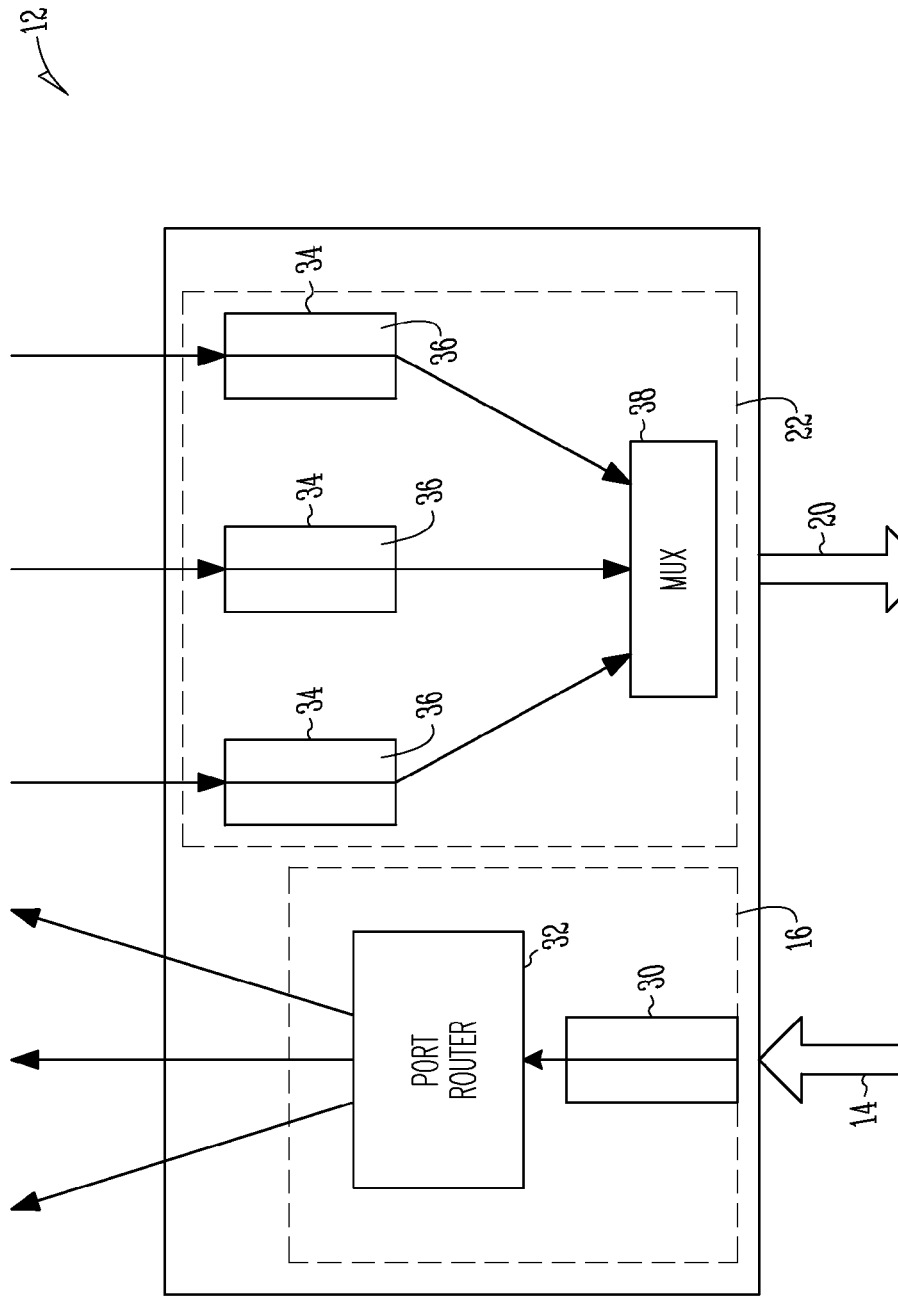
FIG. 3 illustrates a network port.

One embodiment of a network port 12 is shown in FIG. 3. In the network port 12 shown in FIG. 3, router 10 supports two virtual channels. Each input buffer 16, therefore, includes two virtual channel input buffers 30 and a port router 32. Port router 32 takes a packet from one of the virtual channel input buffers 30 and forwards it to one of the other network ports 12 in the manner that will be described below.

Each output buffer 22 includes three staging buffers 34 and a multiplexer 38. Each staging buffer 34 is connected to a port router 32 of a different network port 12. In the embodiment shown, each staging buffer 34 includes a virtual channel staging buffer 36 for each virtual channel. In a router 10 with N network ports, there is, therefore, a 1:N−1 correspondence between each input buffer and its destination staging buffers 34. Multiplexer 38 is used to select a packet from one of the virtual channel staging buffers 36 for transmission to output 20.

By including a staging buffer in each port for each input buffer, or for each virtual channel in systems with virtual channels, you avoid the complications of global arbitration for output buffers. In this scheme, any packet chosen to route from an input port to an output port is guaranteed to advance to the desired staging buffer, because there is no competition for this resource from other input ports.

Figure 4:
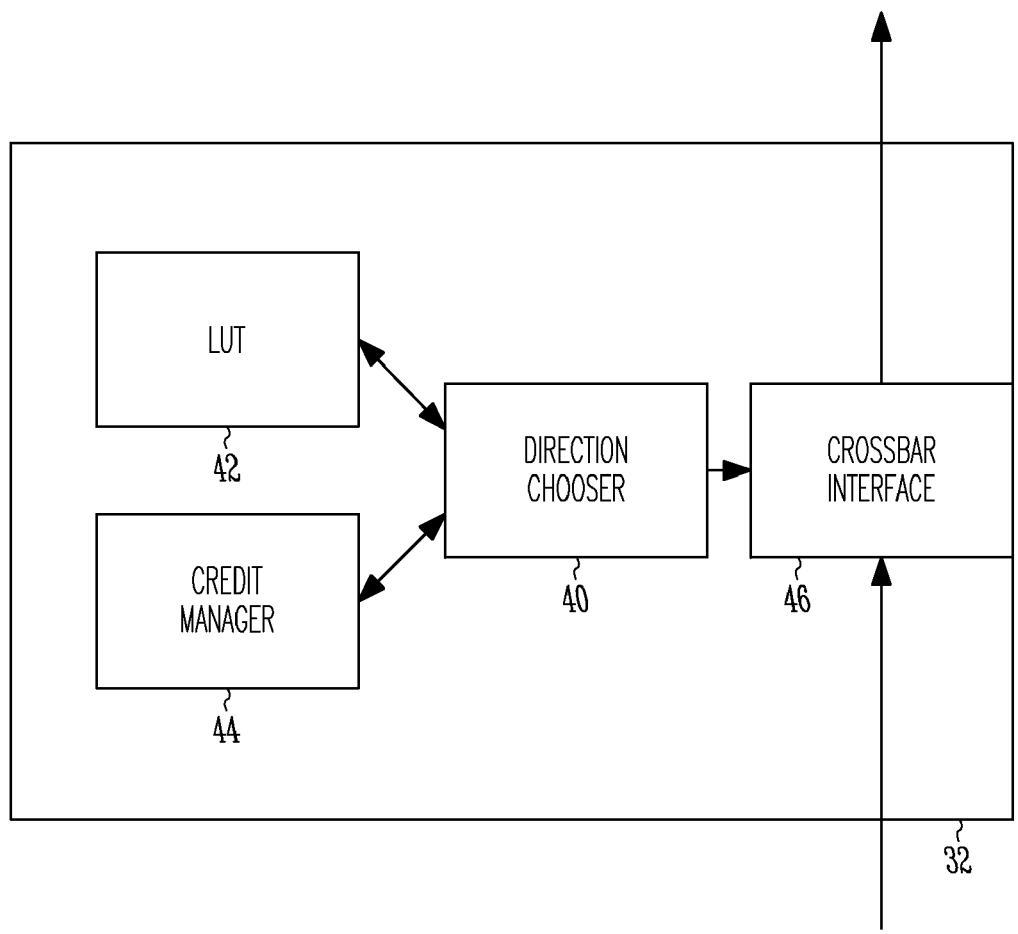
FIG. 4 illustrates a port router.

In one embodiment, each port router 32 includes a direction chooser 40, a look-up table 42, a credit manager 44 and a crossbar interface 46. One such embodiment is shown in FIG. 4.

Router 10 can be used in a computer system having a plurality of nodes connected by a network having a plurality of virtual channels. A packet is received on a first virtual channel associated with a first network port. The packet is stored in the virtual channel input buffer of the first network port corresponding to the first virtual channel. Port router 32 selects a staging buffer 34 associated with a desired virtual channel in a second network port as a destination and forwards the packet to the selected staging buffer, where it is stored. The packet is then read from the selected staging buffer 34 and transmitted on the communications channel of the second network port.

In one embodiment, each input buffer 16 is capable of transferring one packet to one staging buffer 34 at a time. Each output buffer 22 is capable of receiving a packet from two or more input buffers at a time. This eliminates the need for global arbitration as noted above.

In another embodiment, each input buffer 16 is capable of transferring a packet to two or more staging buffers 34 at a time.

In yet another embodiment, each input buffer 16 is capable of transferring a packet on two or more virtual channels at a time.

Figure 5:
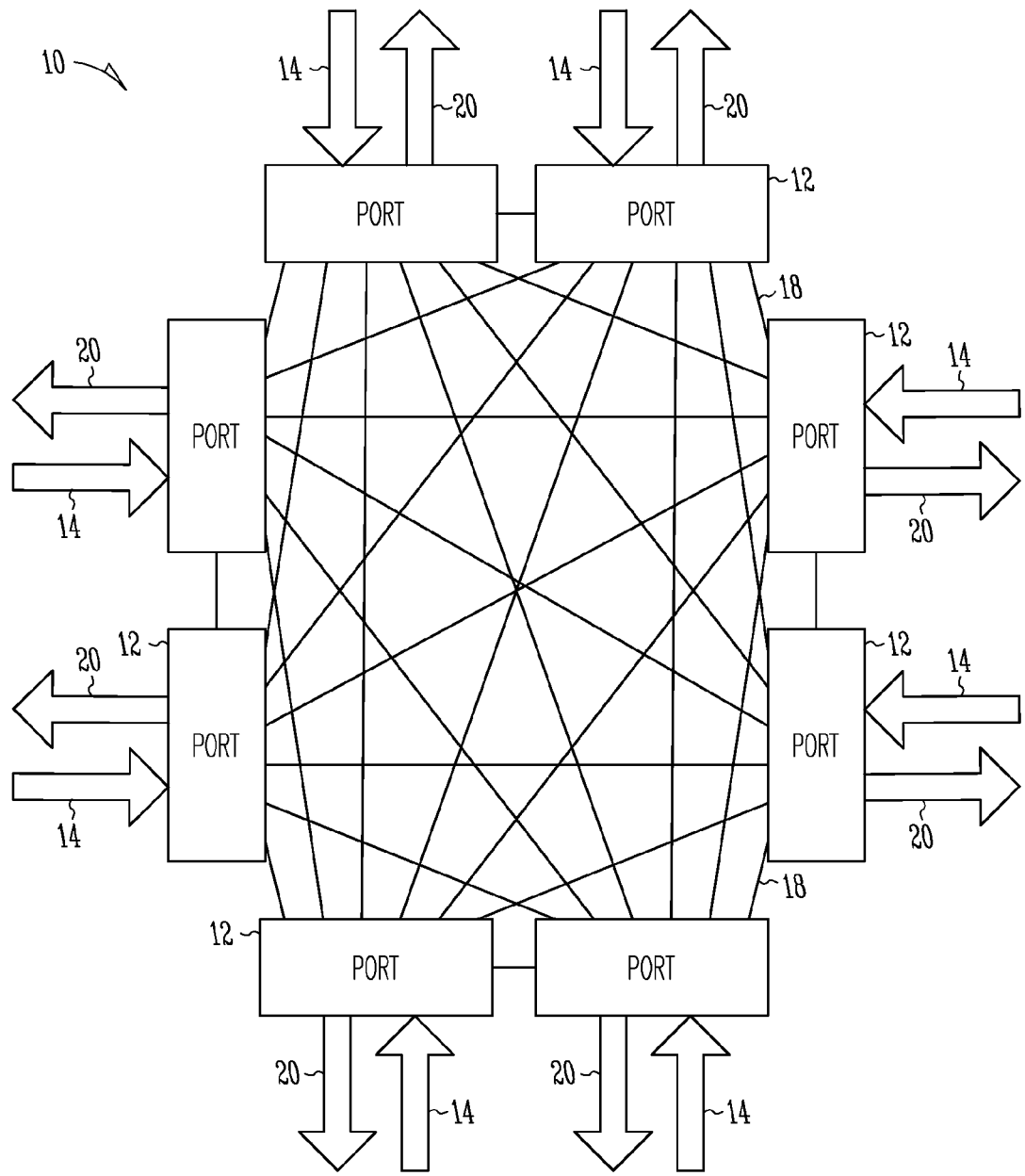
FIG. 5 illustrates an alternate embodiment of a router that can be used in the computer system of FIG. 1.

An alternate embodiment of router 10 is shown in FIG. 5. Router 10 of FIG. 5 includes eight full duplex network ports 12. In one such embodiment, two of the network ports 12 are connected to processors (not shown). The remaining six ports 12 are connected to the network. In one embodiment, data paths 18 between each of the network ports 12 are formed using a crossbar switch. In one such embodiment, the crossbar switch is capable of transferring two or more packets at a time from one input buffer.

Router 10 uses a distributed routing table mechanism where a look up table (LUT) at each input port is used to determine the output port. All routing is virtual cut through, where packets are allowed to move to the destination buffer only if the entire packet fits. This prevents subsequent packets from blocking due to a packet that is straddling a buffer.

Router 10 achieves high performance through a combination of simple arbitration and large buffering. In one embodiment, all routes are traversed using dimension order routing, with the order of traversal being X, Y and then Z dimension.

In one embodiment, each network port 12 supports a plurality of virtual channels. Hardware support is provided to support datelines with two virtual channels per virtual network to allow large-radix tori. In one such embodiment, each input buffer includes a virtual channel input buffer 30 for each virtual channel. Each virtual channel input buffer 30 is capable of storing at least one packet.

Each port 12 includes seven staging buffers 34 (one for each of the other network ports 12). Each staging buffer 34 includes a virtual channel staging buffer for each virtual channel associated with its network port 12.

In one embodiment, an input buffer 16 of each port 12 is capable of transferring one packet to one staging buffer 34 at a time. Each output buffer, however, can receive a packet from two or more input buffers at a time.

In another embodiment, each input buffer 16 is capable of transferring a packet to two or more staging buffers 34 at a time.

In yet another embodiment, each input buffer 16 is capable of transferring a packet on two or more virtual channels at a time.

Figure 6:
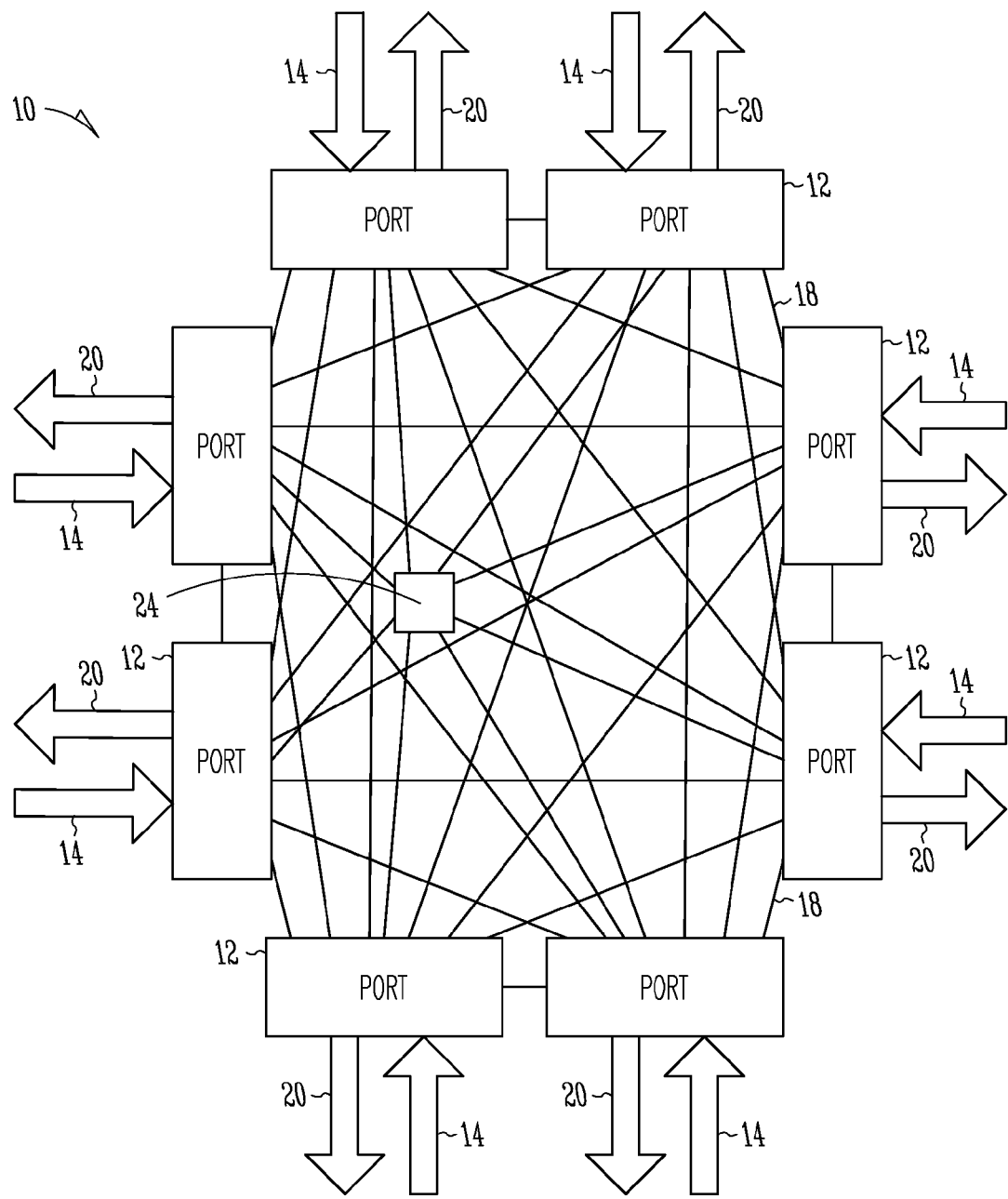
FIG. 6 illustrates another embodiment of a router that can be used in the computer system of FIG. 1.

Yet another alternate embodiment of router 10 is shown in FIG. 6. Router 10 of FIG. 6 includes nine full duplex network ports 12. In one such embodiment, two of the network ports 12 are connected to processors (not shown) and one to a local port 24. The remaining six ports 12 are connected to the network. In one embodiment, data paths 18 between each of the network ports 12 are formed using a crossbar switch.

Local port 24 is associated with control logic within each router 10. In one embodiment, local port 24 is used to read and write from memory mapped registers on router 10. It can also be used to support an external I/O connection.

Once again, router 10 uses a distributed routing table mechanism where a look up table (LUT) at each input port is used to determine the output port. In one embodiment, all routing is virtual cut through, where packets are allowed to move to the destination buffer only if the entire packet fits. This prevents subsequent packets from blocking due to a packet that is straddling a buffer.

In one embodiment, an input buffer 16 of each port 12 is capable of transferring one packet to one staging buffer 34 at a time. Each output buffer, however, can receive a packet from two or more input buffers at a time.

In another embodiment, each input buffer 16 is capable of transferring a packet to two or more staging buffers 34 at a time.

In yet another embodiment, each input buffer 16 is capable of transferring a packet on two or more virtual channels at a time.

In the examples shown in FIGS. 2, 5 and 6, router 10 achieves high performance through a combination of simple arbitration and large buffering. In one embodiment of the examples shown in FIGS. 5 and 6, all routes are traversed using dimension order routing, with the order of traversal being X, Y and then Z dimension.

In one embodiment, each network port 12 supports a plurality of virtual channels. Hardware support is provided to support datelines with two virtual channels per virtual network to allow large-radix tori. In one such embodiment, each input buffer includes a virtual channel input buffer 30 for each virtual channel. Each virtual channel input buffer 30 is capable of storing at least one packet.

Each port 12 includes eight staging buffers 34 (one for each of the other network ports 12 and one for local port 24). Each staging buffer 34 includes a virtual channel staging buffer for each virtual channel associated with its network port 12.

In one embodiment, each port 12 includes a port router 32. Port router 32 includes a direction chooser 40, a look-up table (LUT) 42, a credit manager 44 and a crossbar interface 46. One such embodiment is shown in FIG. 4.

In one embodiment, each LUT 42 includes an entry for all possible destination nodes. An advantage of distributed routing according to the present invention is that no global arbitration is needed. Arbitration at the input and at the output is done strictly on the local level. A packet arriving at the input of a network port is reviewed to determine its destination node. The LUT entry corresponding to the destination node is consulted. In one such embodiment, LUT 42 provides a deterministic route output port and a two bit virtual channel (VC) code. The deterministic route output port is the network port 12 to which the packet should be sent if the route is to remain deterministic. The two bit VC code selects the VC, tells the packet to stay on the same VC, or specifies a dateline for torus deadlock avoidance. In one embodiment, datelines switch a packet on one virtual channel to a second virtual channel, and scrub errant packets on the second virtual channel.

In one embodiment, each packet includes at least twelve destination bits (dest[11 . . . 0]) and each LUT 42 has 4096 entries. This allows for a straight, single-level look up based on dest[11 . . . 0] of the network packet. This approach supports a flexible routing table for systems up to 16×16×16 nodes.

A routing table architecture which can be used advantageously for large networks is described in U.S. patent application Ser. No. 11/932,457, entitled "Routing Table Architecture", Oct. 31, 2007, the description of which is incorporated herein by reference.

From the input buffer, packets are routed to a staging buffer of the target port or to the local block/IO port. In one embodiment, each input buffer 16 includes five virtual channel input buffers 30 (one for the deterministic port and one for each of the four virtual channels). In one such embodiment, round-robin arbitration is used to select which one of the five input virtual channels will use the centralized crossbar. If the staging buffer for the deterministic {port,vc} pair has enough room to accommodate the entire packet, it is placed in the selected deterministic virtual channel in the selected deterministic direction.

This use of input buffers and output staging buffers and simple routing policy does a good job of de-coupling the different directions. Packets come in and get out of the way quickly (into the staging buffers), so that packets behind them going to a different output port are not blocked. It is only when staging buffers back up that coupling between dimensions occurs. Adaptive routing can be used to reduce such coupling by providing alternate, less congested routes. Virtual cut through routing also helps by preventing packets from blocking half way into a staging buffer; if the packet will not fit entirely in its target staging buffer, it remains in its input buffer, where it is eligible to take alternate routes should they become available.

In one embodiment, router 10 uses a credit-based flow control mechanism. Each input port has a Credit Manager 44 that handles the credit counters. Conceptually, the Credit Manager 44 at each input port is an array of counters, CreditsToSend[vc], one counter for each virtual channel. When a flit is removed from the input buffer, the CreditsToSend[vc] counter for that virtual channel is incremented. The router core logic must accumulate two acks before it signals control logic to send an ack in the sideband. A fixed ack granularity of two allows us to maintain ack bandwidth under heavy traffic, since the micropacket can encode only a single ack per virtual channel for every two flits in the micropacket.

If the CreditsToSend[vc] counter is greater or equal to two, then the router core logic asserts an ACK signal and decrements the CreditsToSend[vc] counter by two. The router control logic will then simply stuff the ack into the sideband of an outgoing message on that channel, or create an IDLE packet with the appropriate virtual channel ack bits set.

Router 10 trades off staging buffer space for simple arbitration. Each input port operates completely independently in choosing output ports and in routing packets to staging buffers.

Each output port operates completely independently as well, and can do simple round-robin arbitration amongst the staging buffers. To guarantee fairness and forward progress for all packets, arbitration should be done in two stages: round robin arbitration across the 8 staging buffers should be done independently for each of the virtual channels, and then the five virtual channels should arbitrate for the physical output. This avoids the situation in which the arbiter comes around periodically to a packet within a given staging buffer virtual channel and skips it because its virtual channel is blocked at the moment, only to move on to another staging buffer and allow a packet in that buffer to grab the aforementioned virtual channel, so that when the arbiter comes back to the skipped packet the virtual channel will be busy again and the packet will be skipped again.

In one embodiment, staging buffers 36 and input buffers 30 are sized to hide the round trip latency of transferring a packet from one node to the next node. At a minimum, each staging buffer 36 and each input buffer 30 must hold enough flits for the largest size packet as well as some amount to cover the latency in transferring a packet between the staging buffers 36 and the input buffers 30.

Packet aging can be used instead of straight round robin arbitration to give priority to older packets. In packet aging arbitration a global age is kept for all packets in the network, and virtual channel and physical channel arbitration policies are modified accordingly. An example of this will be discussed next.

In one packet aging approach, router 10 controls its age-based output arbitration via memory mapped registers (MMRs). In one embodiment, all ports on router 10 age at the same rate (set by a constant stored in the RTR_AGE_CLK_PERIOD register). In one such embodiment, however, each port 12 applies a constant bias to the aging rate used in its port that allows software to skew the age by some constant factor depending upon which input port the packet arrived.

A RTR_AGE_RR_SELECT register is used to select the output arbitration policy. In one embodiment, RTR_AGE_RR_SELECT is a 64-bit value that controls, on a per packet basis, how the output arbitration will be handled: either age-based, or round-robin. In one such embodiment, a RTR_PORT_CONFIG register includes fields RQ_AGE_BIAS and RS_AGE_BIAS. These fields provide the age bias for request packets and response packets, respectively.

One representative aging algorithm will be discussed next. In one embodiment, each packet includes an 11-bit age field constructed as shown in FIG. 7. The packet age is restricted to a 0 . . . 255 range. Additional bits, however, are required for bookkeeping. The variables used to describe the aging algorithm are defined in FIG. 7.

The aging algorithm is broken down into three different sections: 1) operations at the input port, 2) operations at the output port, and 3) age clock management. We use the notion of an epoch to denote a period of time. The aging algorithm uses two epoch values, 0 and 1. When a packet arrives it is assigned to the epoch which was active at the time the packet arrived.

A set of counters, epoch_ctr, (global in scope to the router) is maintained to keep track of the number of outstanding packets in each epoch. The epoch numbers and counters are used to determine if the packet has accumulated a substantial amount of time in the router and that a timestamp rollover has occurred.

With each roll of the 8-bit timestamp, we switch epochs if and only if the next epoch has no outstanding packets (i.e. the epoch_ctr[next_epoch]==0). By following this simple rule, we are guaranteed to never rollover the timestamp value more than once. When both epochs have outstanding packets and the timestamp rolls over, we must inhibit the timestamp from rolling over again and thus do not switch epochs.

Figure 8:
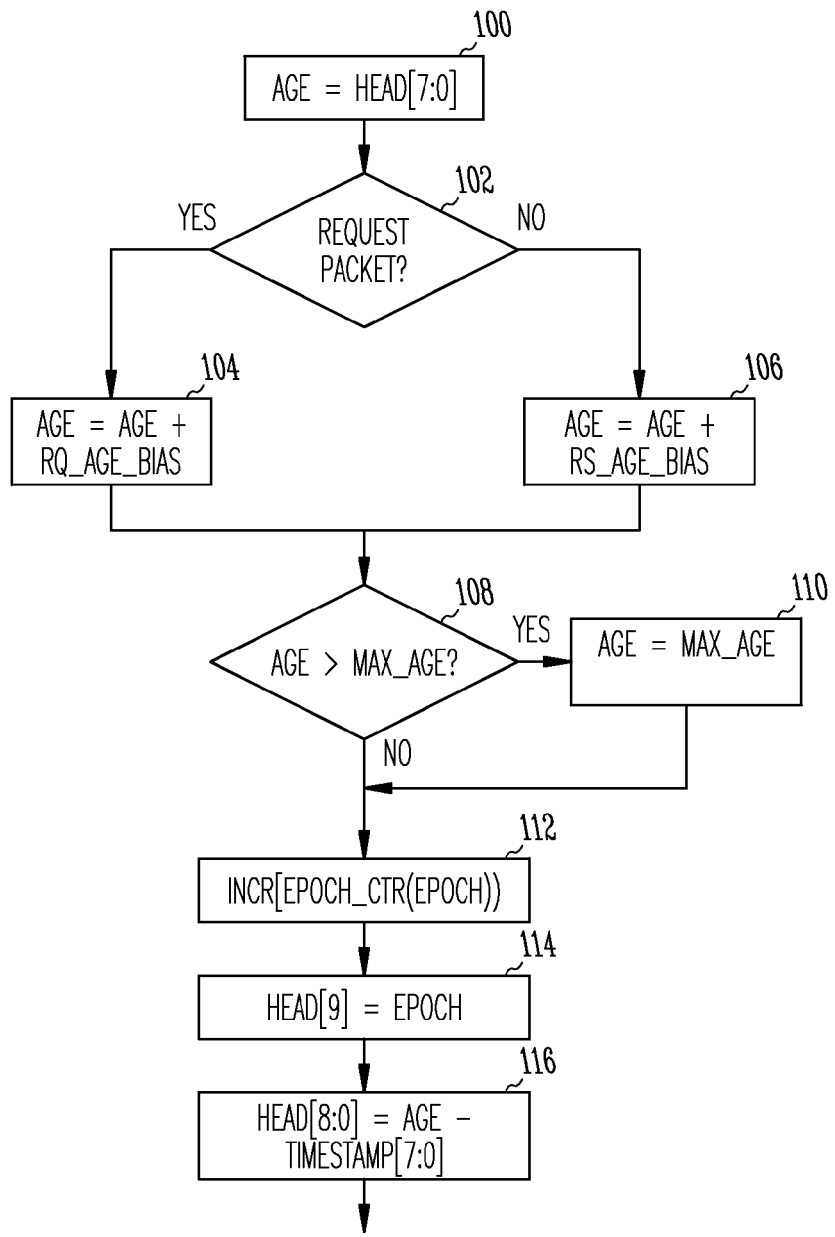

An example of the portion of the aging algorithm at the input ports is given in FIG. 8. When a new packet arrives at an input port, the router extracts the age field from the network packet at 100. In this example, the age field is located at bits HEAD[10:0]. At 102, a check is made on the type of packet, either request or response. If a request packet, the age bias for requests is added to the current packet age at 104 and control moves to 108. If a response packet, the age bias for responses is added to the current packet age at 106 and control moves to 108.

In the example shown, the age must saturate at 255. So, at 108 a check is made to see if the age value plus the age bias has overflowed the age range. If so, control moves to 110 and age is set to the maximum value.

The counter which tracks the number of outstanding packets in each epoch, epoch_ctr, is incremented at 112. The epoch in which the packet arrived is saved in bit HEAD [9] of the header flit at 114. Finally, at 116, the timestamp value is subtracted from the current age and the 9-bit result is saved in the header flit HEAD[8:0]. Since the result of the subtraction may produce a carry bit, it must be preserved (in bit HEAD [8]) and accounted for when the new age is computed at the output port.

Figure 9:
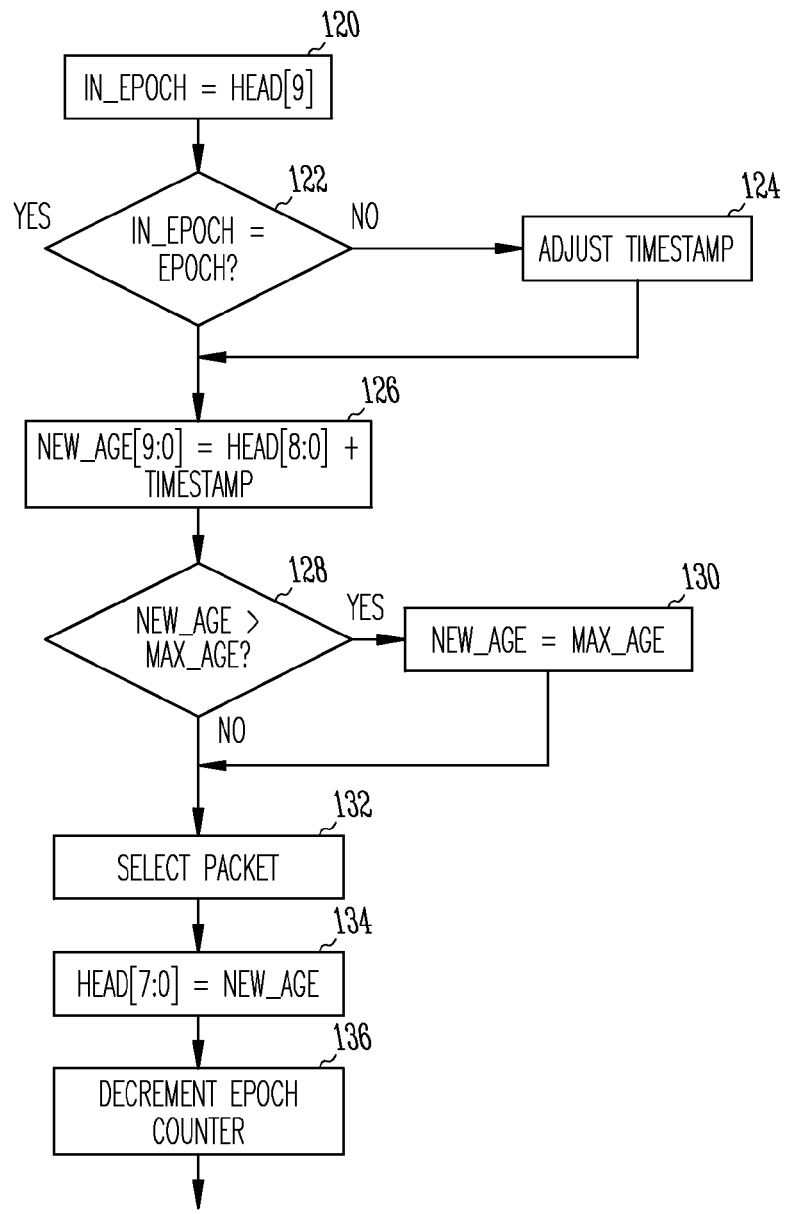

The output arbitration logic considers only non-blocked virtual channels (those with send_credits≧MAX_PACKET_SIZE, which is set by writing bits RTR_PORT_CONFIG[38:35]). A method of applying the aging algorithm at the output ports is shown in FIG. 9. The arbiter inspects the packet at the head of each output staging buffer and computes its new age. The arbiter then does a comparison of the age values to determine the winner, i.e. the packet with the largest computed age value. Ties are broken using a separate round-robin priority scheme among the candidates.

At 120, the epoch that the packet arrived is extracted from bit HEAD[9] of the header flit. At 122, a check is made to determine if the current epoch is the same as the epoch in which the packet arrived. If the current epoch does not match the epoch in which the packet arrived, then the timestamp must have rolled over from 255 to 0; control then moves to 124 and 256 is added to the timestamp before control moves to 126.

At 126, the timestamp is added to the age field, HEAD[8:0], in the header flit. The 10-bit sum is store in new_age where it is checked to determine if the maximum packet age was reached at 128 and 130. Finally, the arbiter chooses the packet with the oldest age, and the adjusted age is stuffed, at 134, into the packet header HEAD[7:0] before transmitting the packet. As the packet is handed off to the link control block for transmission, the epoch_ctr[in_epoch] is decremented at 136.

The rate at which packets age is controlled by the RTR_AGE_CLK_PERIOD memory mapped register (MMR). A write to RTR_AGE_CLK_PERIOD will cause the internal register age_clk_period_reg to be loaded with the value from RTR_AGE_CLK_PERIOD. Periodically, the router will decrement the internal age_clk_period_reg counter. When the counter decrements to zero, the router will increment the timestamp value, and reload the age_clk_period_reg counter with the value from the RTR_AGE_CLK_PERIOD MMR. A pseudocode example of one such approach is shown in FIG. 10.

Figure 11:
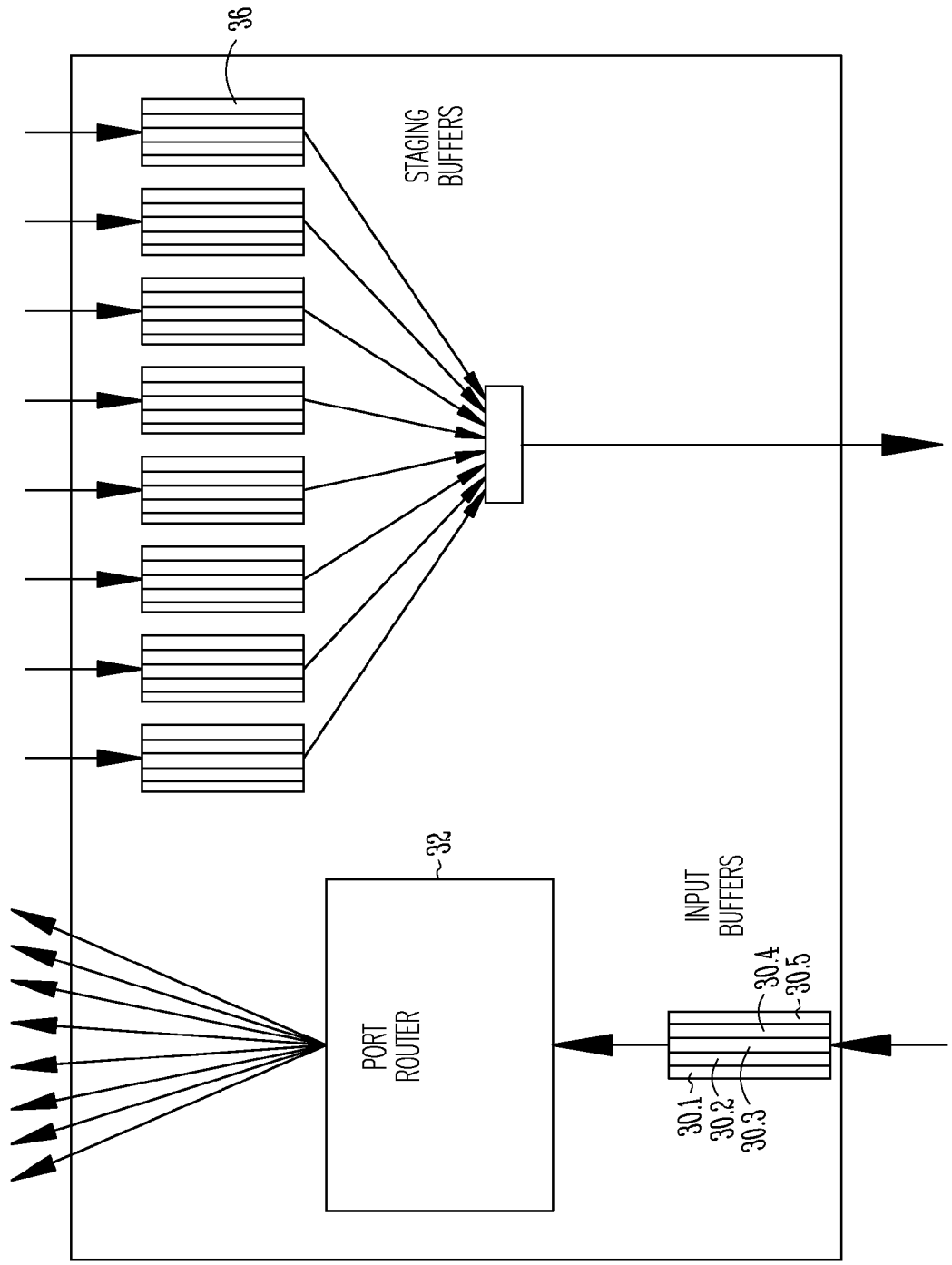
FIG. 11 illustrates an embodiment of a network port for an adaptive router.

In one adaptive routing embodiment, each network port 12 includes two request virtual channels (30.1 and 30.2), two response virtual channels (30.3 and 30.4) and one adaptive virtual channel (30.5). An example of such an embodiment is shown in FIG. 11. The two request virtual channels can be used to allow a torus wraparound ring in a dimension without the possibility of deadlock in that dimension.

From the input buffer, packets route to a staging buffer 36 of the target port or to the local block/IO port. In one embodiment, arbitration to select which one of the five input virtual channels (30.1-30.5) will use the centralized crossbar is done using a round-robin policy. If the staging buffer for the deterministic {port,vc} pair has enough room to accommodate the entire packet, it is placed in the selected deterministic virtual channel in the selected deterministic direction. Otherwise, when the deterministic staging buffer is full above some high water mark, and there is room for the packet in the adaptive virtual channel staging buffer of one of the available adaptive directions, then the packet is routed to the adaptive virtual channel in one of the adaptive directions. When multiple adaptive alternatives are available, the direction taken is selected by which buffer has the most space.

In one embodiment, as noted above, each look up table (LUT) 42 has 4096 entries. This allows for a straight, single-level lookup based on dest[11 . . . 0] of the network packet. Such an approach is capable of supporting a flexible routing table for systems up to 16×16×16 nodes.

In one such embodiment, a read of LUT 42 based on the destination address stored in the packet returns three output fields used to route the packet. The first, the deterministic route output port, is discussed above. The second field, a mask of allowable adaptive output ports, is used to determine if the packet is eligible to route adaptively. This mask is cleared if the packet is not marked as adaptive. The last field, a two bit virtual channel code, selects the virtual channel, tells the packet to stay on the same virtual channel, or specifies a dateline for torus deadlock avoidance. Datelines switch a packet on VC0 to VC1, and scrub any errant packets on VC1.

As noted above, the use of input buffers and output staging buffers and a simple routing policy does a good job of decoupling the packets moving in different directions. Packets come in and get out of the way quickly (into the staging buffers), so that packets behind them going to a different output port are not blocked. It is only when staging buffers back up that coupling between dimensions can occur. Adaptive routing can be used to reduce such coupling by providing alternate, less congested, routes. Virtual cut through routing also helps by preventing packets from blocking half way into a staging buffer; if the packet will not fit entirely in its target staging buffer, it remains in its input buffer, where it is eligible to take alternate routes should they become available.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A router, comprising:
   one or more router configuration registers;
   a plurality of network ports, wherein each network port supports a plurality of virtual channels, wherein each network port includes:
   an input;
   an output;
   an input buffer connected to the input, wherein the input buffer includes a port router and a plurality of virtual channel input buffers, wherein each virtual channel input buffer receives data from the input corresponding to an associated one of the plurality of virtual channels and wherein the port router is operable to select a packet from one of the virtual channel input buffers and sends the selected packet to one of the other network ports;
   a plurality of staging buffers, wherein each staging buffer is associated with and coupled to receive data from a particular input buffer in one of the other network ports; and
   a multiplexer, connected to the staging buffers and to the output, for selecting data stored in the staging buffers to be transferred to the output; and
   connection means, connected to each of the plurality of network ports, for connecting each network port to each of the other network ports within the router, wherein the connection means includes means for transferring data stored in a virtual channel input buffer in one network port to its corresponding staging buffer in any of the other network ports,
   wherein each of the virtual channel staging buffers in a network port is associated with and operable to receive data from one of the virtual channel input buffers in one of the other network ports, and wherein each of the staging buffers in a network port includes a same number of virtual channel staging buffers as virtual channel input buffers are present in other coupled network ports in the router.

2. The router of claim 1, wherein each port router performs adaptive routing.

3. The router of claim 1, wherein each port router includes a look-up table (LUT), wherein the LUT supplies a deterministic route output port as a function of a plurality of destination bits.

4. The router of claim 3, wherein the LUT also supplies, as a function of the plurality of destination bits, a virtual channel (VC) code used for adaptive routing.

5. The router of claim 3, wherein each staging buffer is sized to accommodate virtual cut through routing, and wherein each staging buffer includes a virtual channel corresponding to a virtual channel in one of the virtual channel input buffers.

6. The router of claim 1, wherein each staging buffer is sized to accommodate virtual cut through routing.

7. The router of claim 6, wherein the LUT also supplies, as a function of the plurality of destination bits, a virtual channel (VC) code used for adaptive routing.

8. The router of claim 1, wherein the connection means transfers two or more packets at a time from each input buffer.

9. In a network system having a plurality of nodes connected by a network having a plurality of virtual channels, a method of routing packets from one node to another node, the method comprising:
   providing a node router, wherein the node router includes at least three network ports, including a first and a destination network port, wherein each network port includes a communications channel comprising an input and an output, and a plurality of virtual channel input buffers and a plurality of virtual channel staging buffers, wherein each of the virtual channel staging buffers is operable to receive data from one of a plurality of virtual channel input buffers of another network port;
   receiving a packet on a first virtual channel associated with the first network port;
   storing the packet in the virtual channel input buffer of the first network port corresponding to the first virtual channel;
   selecting a network port as a destination port from the at least three network ports comprising a part of the router;
   transferring the packet to the network port selected as the destination port, wherein transferring includes storing the packet into the virtual channel staging buffer in the destination network port corresponding to the virtual channel input buffer of the first network port, wherein each of the virtual channel staging buffers in a network port is associated with and operable to receive data from one of the virtual channel input buffers in one of the other network ports, and wherein each of the staging buffers in a network port includes a same number of virtual channel staging buffers as virtual channel input buffers are present in other coupled network ports in the router;
   reading the packet from the virtual channel staging buffer in which it was stored and
   transmitting the packet on the communications channel of the network port selected as the destination port.

10. The method of claim 9, wherein selecting a network port includes determining if the packet should be routed adaptively.

11. The method of claim 9, wherein selecting a network port includes selecting the network port as a function of a virtual channel code stored in a lookup table (LUT).

12. The method of claim 9, wherein selecting a network port includes selecting the network port as a function of a destination port identifier stored in a lookup table (LUT).

13. In a router having an input port and a plurality of output ports, a method of age-based routing, comprising:
   providing a plurality of epoch counters;
   receiving a packet at the input port;
   extracting an age from the packet received at the input port;
   determining a current epoch active at the time the packet is received at the input port;
   incrementing an epoch counter associated with the current epoch;
   forwarding the packet to one of the plurality of output ports, wherein forwarding includes transmitting an age value with the packet, wherein the age value is a function of the age extracted from the packet;
   receiving the packet at the output port;
   extracting the age value from the packet;
   storing the packet in the output port;
   comparing the packet to other packets stored in the output port;
   transmitting the oldest of the stored packets from the output port;
   decrementing the epoch counter associated with the transmitted packet
   wherein each of the plurality of epoch counters is configured to store a number of outstanding packets in a corresponding one of a plurality of epochs including a first epoch and a second epoch, and
   switching from the first epoch to the second epoch upon determination that the epoch counter associated with the second epoch is zero, wherein the switching includes refraining from switching the epochs from the first to second epoch when the epoch counter associated with the second epoch is not zero.

14. The method of claim 13, wherein extracting an age includes adding a request packet age bias offset if the packet is a request.

15. The method of claim 13, wherein extracting an age includes adding a response packet age bias offset if the packet is a response.

16. The method of claim 13, wherein the method further comprises calculating a timestamp and wherein comparing includes updating the time value associated with one or more of the stored packets as a function of the timestamp.

17. The method of claim 16, wherein the timestamp increments at a rate selected by a value stored in a memory-mapped register (MMR).

* * * * *

UNITED STATES PATENT AND TRADEMARK OFFICE
CERTIFICATE OF CORRECTION

| | | |
|---|---|---|
| PATENT NO. | : 7,852,836 B2 | Page 1 of 1 |
| APPLICATION NO. | : 11/932413 | |
| DATED | : December 14, 2010 | |
| INVENTOR(S) | : Steven L. Scott et al. | |

It is certified that error appears in the above-identified patent and that said Letters Patent is hereby corrected as shown below:

On the Title page, in Item (60), under "Related U.S. Application Data", in column 1, line 13, delete "60/253,361," and insert -- 60/523,361, --, therefor.

Signed and Sealed this
Fifteenth Day of March, 2011

David J. Kappos
*Director of the United States Patent and Trademark Office*